UNITED STATES PATENT OFFICE.

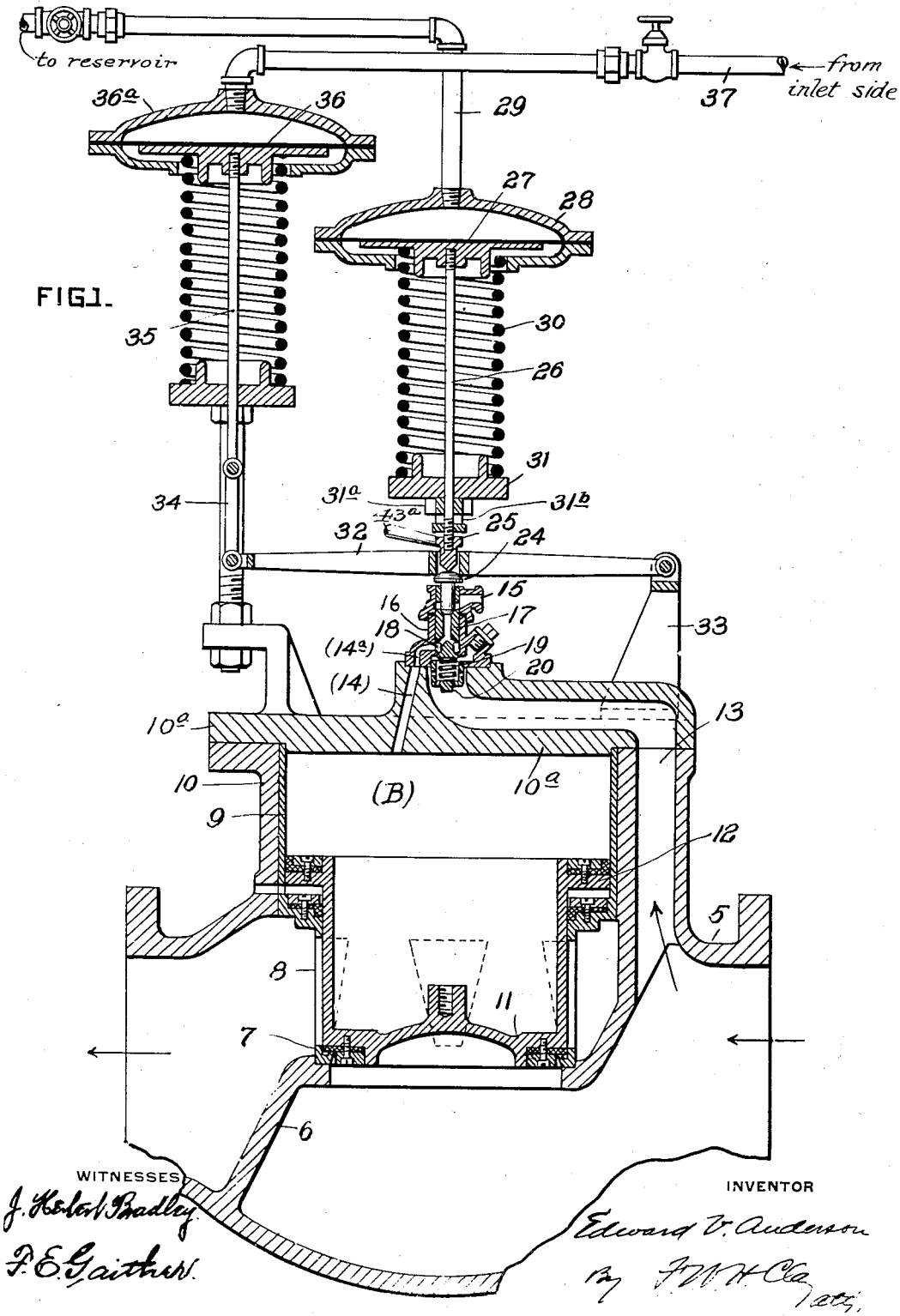

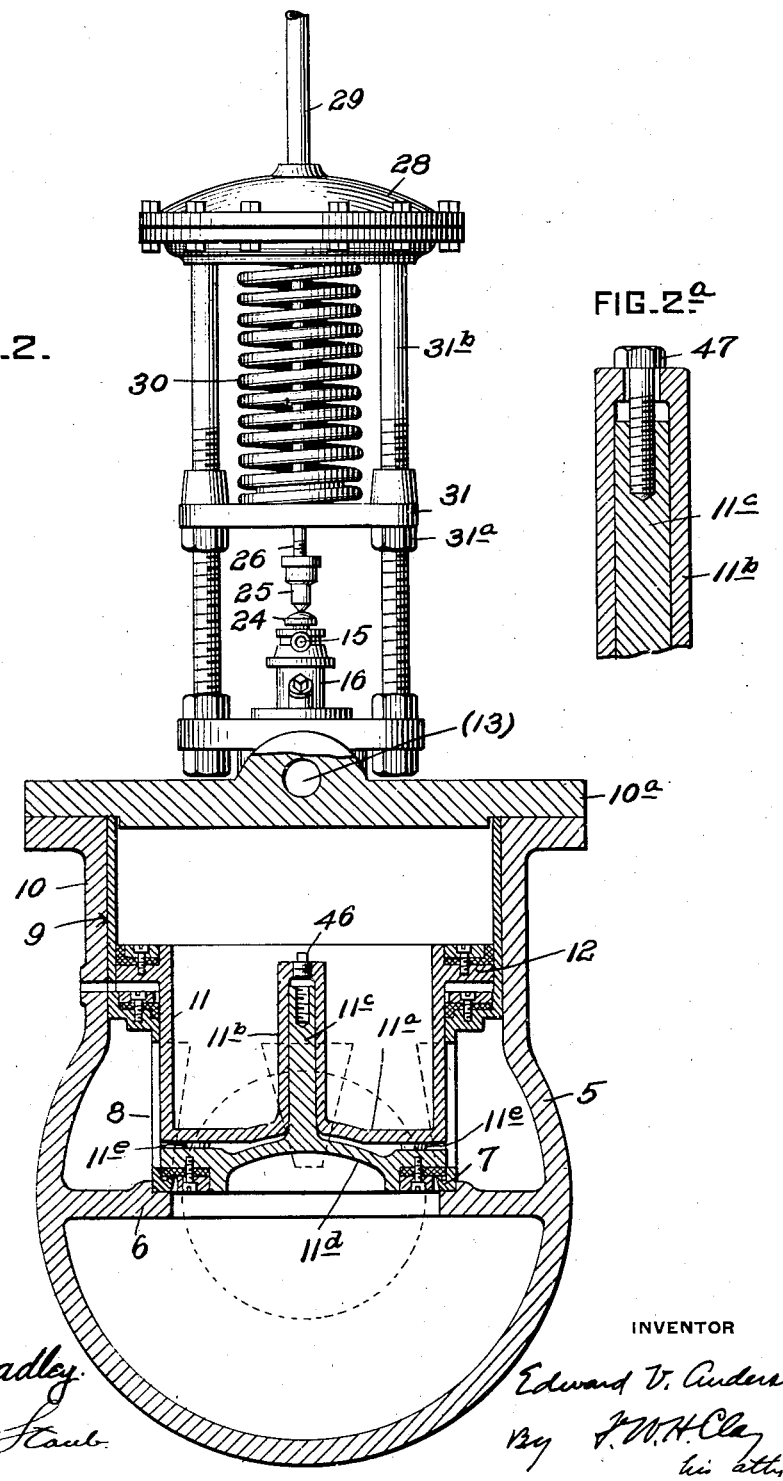

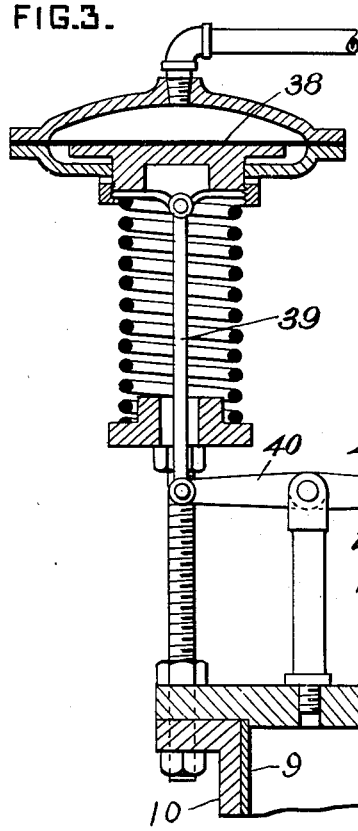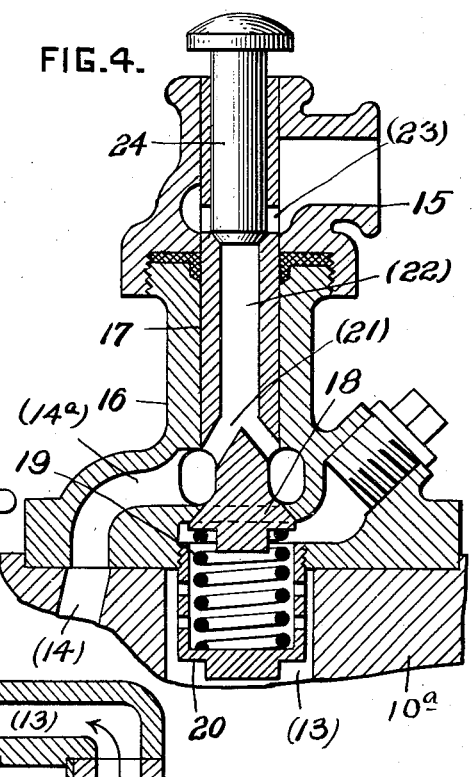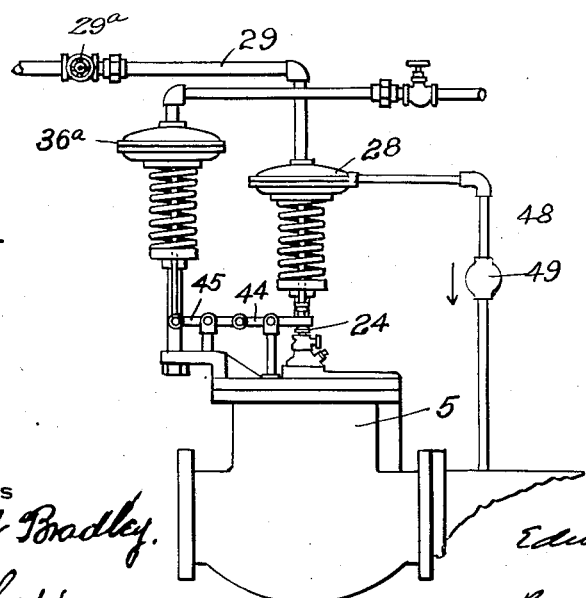

EDWARD V. ANDERSON, OF MONESSEN, PENNSYLVANIA, ASSIGNOR OF ONE-HALF TO CHARLES E. GOLDEN, OF CRAFTON, PENNSYLVANIA.

AUTOMATIC VALVE.

1,189,334.      Specification of Letters Patent.     Patented July 4, 1916.

Application filed November 6, 1914. Serial No. 870,589.

*To all whom it may concern:*

Be it known that I, EDWARD V. ANDERSON, a citizen of the United States, residing at Monessen, in the State of Pennsylvania, have invented certain new and useful Improvements in Automatic Valves, of which the following is a specification.

My invention relates generally to the valves used for maintaining a uniform stage of water in tanks and the like, and more particularly to pilot valves and other devices for automatically governing a main valve according to conditions of pressure.

Still more particularly I have improved the construction and operation of pilot valves, and other devices for taking care of emergencies.

In the accompanying drawings, Figure 1 is a central vertical section of a main valve, a pilot valve and two pressure control devices for the pilot valve; Fig. 2 is a side elevation at right angles to the view of Fig. 1, and a section of the casing, with another form of main valve therein; Fig. 2ª is a section of the valve stem in Fig. 2. Fig. 3 is a partial section on a part of the main valve and the pilot in Fig. 1, but supplied with an alternative form of automatic pressure operating device, and an added device for interrupting the automatic action; Fig. 4 is an enlarged section of the pilot valve itself. Fig. 5 is a side elevation of an alternative arrangement of levers for operating such a pilot valve.

In addition to the usual functions of a controlling altitude valve, it is often highly advantageous to provide for automatically closing the valve in case of a decided change of pressure in the water line, as in case of fire. Again there are often occasions when it is desired to interrupt the automatic action of automatic controlling valves.

In Fig. 1, I represent at 5 a valve casing provided with the usual perforated partition 6, carrying a valve seat 7, located at the bottom of a cylindrical liner 8, which latter is preferably made integral with another larger liner 9 in the hood 10 of the valve casing. The valve 11 is in cylindrical form, and is provided at the top with a piston 12 which, operating in the larger cylinder 9, forms a dashpot for both opening and closing, and also operated to close the main valve 11, by manipulation of the pressure behind it. For this latter purpose, I provide in the valve casing a passage (13) from the high pressure side, which intermittently communicates with the chamber (B) above the valve piston 12 by means of port (14) and the pilot valve. The pilot valve is arranged to also exhaust the chamber (B) at the outlet 15, as will be made more clear from Fig. 4. Thus, on the main valve casing 10ª I provide the pilot valve casing 16, carrying a cylindrical stem 17, carrying at the bottom a valve 18 opening downward against the pressure of spring 19, which is supported in the perforated hood 20 in the passage (13) from the high pressure side of the main valve. Immediately above valve 18 the stem 17 has lateral perforations (21) and a central passage (22), connected by ports (23) to the open outlet 15. Both the ports (23) and the passage (22) are closed by a plunger 24.

Referring now to Figs. 1 and 2 the plunger 24 is normally held downward to close ports 22 and 23 by stem 25 carried on the lower end of rod 26 attached to a movable diaphragm 27 in the casing 28. This diaphragm is normally balanced between storage tank water pressure on the upper side of the diaphragm, entering from pipe 29, and the compression spring 30, which rests against the underside of the diaphragm 27 and on a carrier 31 riding freely over the rod 26, and held by screws 31ᵇ. It is adjustable in vertical position by nuts 31ª on supporting screws. The pilot valve 18, when open, allows the entry, by passage 14ª, of the high pressure fluid from passage (13) into chamber (B). Since the area of piston 12 is greater than that of valve 11, this of course keeps the main valve 11 closed; but since spring 19, tends to move valve 18 upward, it is evident that valve 18 will remain open only so long as there is a downward pressure on the plunger 24, taking effect on the hollow sliding stem 17 of which valve 18 is an integral part. That is, the main valve will remain closed as long as the pressure in the receiving tank, with which pressure pipe 29 communicates, is above a certain predetermined minimum arranged by adjusting the pressure of spring 30 by nuts 31ª. When this pressure further diminishes, diaphragm 27, rod 26, and plug 25, will rise, allowing spring 19 to close pilot valve 18. This rising of valve 18 and its hollow stem 17 will place the ports (21),

(22) and (23) in communication with the outer atmosphere and with ports 14, 14ª, from chamber (B),—the pressure from chamber (B) meantime raising the plunger 24, which is free to rise because the pressure of plug 25 has been released. This release of pressure in chamber (B) of course immediately permits opening the main valve and adding to the supply in the receiving tank, which it will be understood is connected to the outlet side of main valve casing 5. For the fire pressure emergency, I provide a lever 32, pivoted at one end to a stud 33 fixed on the valve casing and resting on the top of plug valve 24 but not interfering with the motion of the plug 25. This lever at the other end is connected by a link 34 with a stem 35 of spring balanced pressure diaphragm 36, in casing 36ª connected by pipe 37 with the main line on the inlet side of valve casing 5, (or to any other desired source of pressure which is operated by the auxiliary closing device.) Obviously, and quite independently of the action of diaphragm 27, if pressure suddenly rises in pipe 37, and on top of balanced diaphragm 36, the lever 32 will be depressed and in turn will force down the outlet plunger 24 and open the valve 18 of the pilot. This first closes the escape from chamber (B), and then puts it in communication with the high pressure side through passage 13, immediately closing the main valve. By this means, while in normal operation the device automatically maintains a given pressure in the receiving tank, yet without interfering with this normal automatic pressure controlling operation, the supplementary device 36, 32, closes the main valve automatically in case of fire pressure or other emergency.

In Fig. 3 I have shown the same pilot valve and controlling device, but modified in arrangement so as to open the main valve when a certain maximum pressure is exceeded on the supply side. That is, when the diaphragm 38 is depressed, its stem 39 will move the lever 40, raising the free end 41 off the plug valve 24 of the pilot, thus allowing escape from chamber (B) and closing valve 18 from passage 13, so as to allow the main valve to open and permit a backward flow therethrough.

For either arrangement, I provide a device by which the automatic action may be interrupted. That is, as in Fig. 3, the lever 40 takes effect on the plug 24 through the screw 42, which has an attached handle 43; and the parts are so adjusted that by turning the screw 42 in one direction the motion of lever 40 is not sufficient to release plug 24, while by turning the screw 42 in the other direction, the motion of lever 40 is not sufficient to depress plug 24. In the form of Fig. 1 the handle 43ª will of course turn the plug 25 on rod 26. By mere turn of the handle 43 or 43ª therefore, the automatic action of the pilot is interrupted and the main valve is left permanently in either open or closed position as desired.

In some designs I prefer to replace the levers 32 of Fig. 1 and 40 of Fig. 3, by a pair of levers 44 and 45 as shown in Fig. 5. This permits the auxiliary diaphragm device 36ª to move plug 24 of the pilot valve in the same direction and the same amount, as will be obvious.

In Fig. 2 I have shown the structure of the main valve corresponding to 11 in Fig. 1, which is arranged to automatically close the valve in the case of a break in the supply line or on the high pressure side, in order to prevent backflow from a tank or standpipe or other reservoir being fed. That is, the valve proper is made in the form of a loose disk 11ᵈ attached to the cylinder part 11 by means of a stem 11ᶜ extending up into the hollow stem 11ᵇ made integral with the bottom 11ª of the cylinder. The bottom 11ª and the disk 11ᵈ are separated from each other by a series of studs 11ᵉ. By this construction the valve part 11ᵈ may drop independently of the cylinder 11 and piston 12, whenever it happens that the pressure on the lower or inlet side is less than that on the upper or outlet side, since the pressure on the outlet side has free access to the top of the valve disk. When it is desired, however, the disk 11ᵈ may be firmly attached to the valve body 11 by insertion of a screw 47 connecting hollow stem 11ᵇ with a solid stem 11ᶜ, as shown in Fig. 2ª. That is, the screw 47 replaces the plug 46 in Fig. 2 and prevents relative movement of the two parts of the main valve. When so connected the valve operates in the same way as the structure of Fig. 1.

It will be observed that the particular construction of the pilot valve shown in Fig. 4, by which a single movement of the parts in one direction, first closes the escape passage and then opens the inlet passage, makes this device peculiarly effective for both altitude control and for the auxiliary emergency features. The action is positive and certain; the outlet port (23) cannot be opened until the valve 18 is entirely seated, and on the other hand, the valve 18 cannot be unseated as long as there is any escape through port (23). Moreover, the action of the valve can be readily and delicately adjusted by means of the nuts 31ª on the screws 31ᵇ. The use of a valve which is entirely operated by imposing or releasing pressure on top of plug 24 enables the pilot to be independently operated by several actuating devices, such as the diaphragm devices 28 and 36, or the hand control 43 or 43ª of Fig. 3. By the combination of devices in Figs. 1 and 2, the main valve may be automatically operated to maintain a particular pressure in normal action, and yet be either automatically or manually prevented from the normal operation, while the main valve serves as a check in case of a break on the high pressure side. Other advantages will readily occur to those familiar with the art.

The structure shown also readily lends itself to a simple provision for allowing the stored water to run back for distribution through the main, if desired, whenever the pressure on the inlet side becomes less than that on the outlet side of the main valve. Thus, in Fig. 5, the diaphragm chamber 28 is connected by pipe 48, containing a downward-opening check valve 49, to the inlet side of casing 5. Thus the operation of the pilot valve and control, will continue so long as the pressure at the inlet side of valve casing 5 is greater than the pressure in the tank to which pipe 29 is connected. But if, as in case of fire, the supply line pressure should drop, the check valve 49 will be forced open by the superior pressure in the storage tank and in pipe 29, and, since the effective opening in pipe 48 is larger than in pipe 29 as regulated by the cut-off valve 29ª in this pipe, the water may not only run back from the storage vessel into the supply pipe, but the effective opening being larger in pipe 48 will render it impossible for the pressure to accumulate in the chamber 28 so as to depress the pilot valve 18 and close the main valve in the casing 5 as heretofore described with respect to Fig. 1.

Having thus described my invention and illustrated its use, what I claim is the following:

1. The combination with a main valve comprising a movable element provided with a piston, of a pilot valve adapted to open the main valve by releasing pressure behind said piston, and a pressure controlled device to automatically operate said pilot valve and independent means to operate said pilot valve controlled by the pressure from the inlet side of the main valve, substantially as described.

2. The combination with a main valve adapted to be opened by release of pressure behind it, a pilot valve and proper ports adapted to normally maintain pressure behind said main valve or to release said pressure, of a pressure operated controlling device governing said pilot valve, and a separate emergency pressure operated device connected to operate the pilot valve independently of said first pressure control.

3. The combination with a main valve comprising a cylindrical valve body reciprocating in a cylinder and having an enlarged piston at its upper end, of a casing having a passage from the high pressure side to the top of said piston, a pilot valve normally closing said passage, a device to operate the pilot valve to open said passage comprising a diaphragm subjected on one side to adjustable spring pressure and on the other side to the pressure of the line on the outlet side of the main valve, an actuating element independent of said pressure device, adapted to open the pilot valve, and a pressure and spring operated diaphragm connecting to said actuating device, whereby to operate the pilot valve by changes of pressure on the inlet side of the main valve.

4. The combination of a main valve adapted to be operated by fluid pressure from the supply side of the line in which it is placed, a pilot valve adapted to control such fluid pressure, a pressure diaphragm and connections whereby to operate the pilot valve with change of pressure thereon, and a hand-operated adjusting element in the connections between said diaphragm and pilot valve, adapted to render such control ineffective at will.

5. The combination with a main valve adapted to be operated by varying the pressure on top of it, of a pilot valve comprising a casing having an opening to the top of the main valve and an opening to the atmosphere, a reciprocating cylinder in said casing having at the one end a valve and at the other end a shifting plug controlling an opening from the said hollow cylinder to the atmosphere.

6. In a pressure controlled automatic valve comprising a piston, a dashpot, an automatic pilot to manipulate the pressure in said dashpot, a main valve carried loosely on said piston and adapted to close independently of the piston when the pressure on the inlet side falls below the pressure on the outlet side.

In testimony whereof I have hereunto signed my name in the presence of the two subscribed witnesses.

EDWARD V. ANDERSON.

Witnesses:
  FRED'K. STAUB,
  W. A. HECKMAN.